United States

[11] 3,634,749

[72] Inventor Robert M. Montgomery
Indialantic, Fla.
[21] Appl. No. 54,917
[22] Filed July 15, 1970
[45] Patented Jan. 11, 1972
[73] Assignee Radiation, Inc.
Melbourne, Fla.

[54] ACOUSTO-OPTICAL SIGNAL PROCESSING SYSTEM
16 Claims, 5 Drawing Figs.

[52] U.S. Cl..................................................... 324/77 I,
235/181, 250/161
[51] Int. Cl...................................................... G01r 23/16
[50] Field of Search......................................... 324/77;
250/199, 161; 350/160; 179/1; 343/11; 315/12;
340/15.5; 235/181

[56] References Cited
UNITED STATES PATENTS
3,564,405  2/1971  Kogelnik ....................... 324/77

*Primary Examiner*—Edward E. Kubasiewicz
*Attorney*—Donald R. Greene

ABSTRACT: An acousto-optical signal processing system usable for signal correlation or spectrum analysis. Collimated light passes through an acousto-optical cell to provide a spatial carrier that is modulated in accordance with signal information. A time integrating imaging detector, such as a Vidicon, receives this carrier, and a filter separates the modulating signal information from other light signals received by the imaging detector. Resolution requirements of the imaging detector are reduced by an optical grating. The acousto-optical cell may have reflectors causing the incoming light to make several passes across the cell before exiting.

ACOUSTO-OPTICAL SIGNAL PROCESSING SYSTEM

This invention relates to an acousto-optic signal-processing system which may be used for signal correlation or for spectrum analysis.

Various acousto-optic signal-processing systems have been proposed heretofore for correlating an unknown incoming signal and a reference standard, which may be either an active signal or a passive optical pattern. Typically, such prior systems have a limited correlation time which restricts their practical utility. One important aspect of the present invention is directed to a system which is much less limited as to its correlation time.

Another important aspect of this invention is concerned with spectrum analysis over a very small bandwidth in the kilocycle frequency range. Typically, the acousto-optic systems previously proposed for spectrum analysis were not capable of adequate frequency resolution within a narrow bandwidth, and this inherent limitation restricted the uses to which such prior acousto-optic spectrum analyzers could be put.

It is a principal object of this invention to provide a novel and improved acousto-optic signal-processing system which may be used advantageously for signal correlation or, with slight modification, for spectrum analysis.

Another object of this invention is to provide a novel and improved acousto-optic signal-processing system which provides at an imaging detector a spatial carrier that is modulated by the cross product of a time-delayed input signal and a reference signal and that enables this cross product to be separated from other light present at the detector.

Another object of this invention is to provide a novel and improved acousto-optic signal-processing system which requires only minimal spatial coherence in the light source.

Another object of this invention is to provide a novel and improved acousto-optic signal-processing system whose optical components are not required to be diffraction limited and which, therefore, may be of relatively low cost and compact size.

Another object of this invention is to provide a novel and improved optical correlator which enables real time signal correlation that is not limited to the acoustic signal propagation time in its light modulator cell.

Another object of this invention is to provide a novel and improved signal correlator having a detector arrangement at the receiver which extends over the image there of the light transmitted through an acousto-optic modulator and provides a time integration of the cross product of two modulating input signals to the modulator.

Another object of this invention is to provide a novel and improved acousto-optic spectrum analyzer capable of frequency resolution within a very narrow bandwidth, particularly in the kilocycle frequency range.

Another object of this invention is to provide such a spectrum analyzer in which the bandwidth being analyzed may be changed readily.

Further objects and advantages of this invention will be apparent from the following detailed description of certain presently preferred embodiments, which are described with reference to the accompanying drawings.

Figure 1:
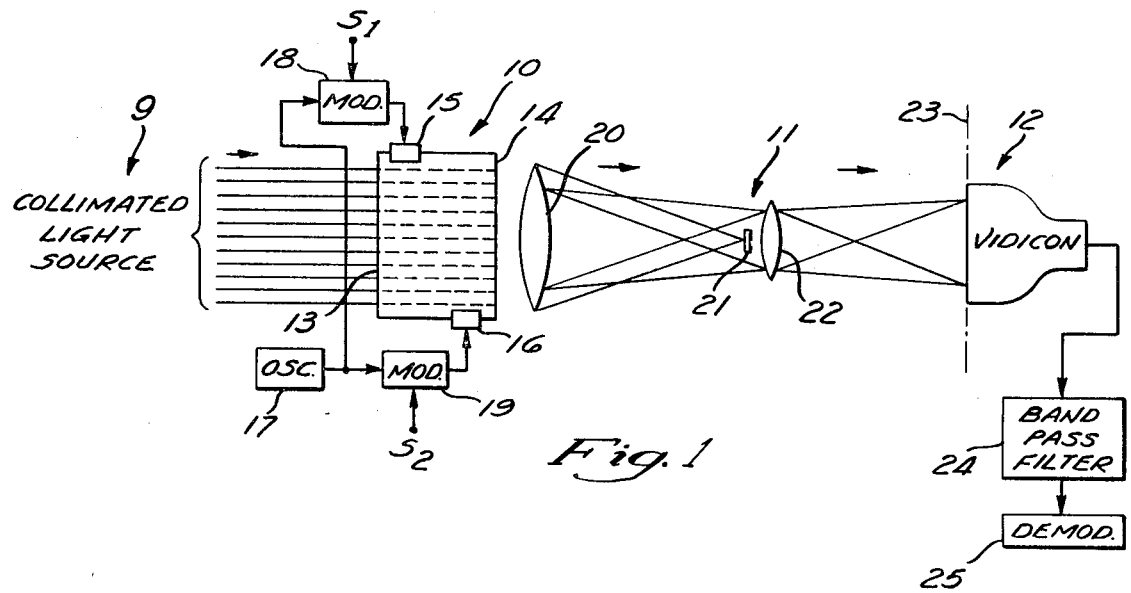
FIG. 1 is a schematic view of a first embodiment of a signal correlator in accordance with the present invention.

Referring first to FIG. 1, the signal correlator illustrated schematically there includes an acousto-optic light modulator cell 10, an optical system 11 at the output side of this modulator, and an imaging detector 12.

The light modulator cell 10 is a closed container containing a suitable light-transmitting medium, such as water, through which compressional waves may be propagated. The container has transparent windows 13 and 14 on its opposite sides. A collimated light source, designated generally at 9, directs light through the light modulator cell in a horizontal direction in FIG. 1.

First and second electromechanical transducers 15 and 16, preferably piezoelectric transducers, are mounted at the opposite ends of the light modulator cell. Preferably, as shown, these transducers are offset from each other across the cell in the direction in which light is transmitted through the cell (i.e., perpendicular to the windows 13 and 14). When energized, the transducer 15 or 16 produces ultrasonic frequency compressional waves that travel along the cell perpendicular to the direction of light transmission through the cell. The respective compressional waves produced by the transducers are oppositely directed, due to the mounting of the respective transducers at the opposite ends of the cell.

The first transducer 15 is energized by a fixed frequency oscillator 17 whose output is amplitude modulated in a modulator 18 by a signal $S_1$, which may be an unknown input signal.

The second transducer 16 is energized by the same oscillator through a modulator 19 in which the oscillator output is amplitude modulated by a second signal $S_2$, which may be a known reference signal.

When the light modulator cell is operating in the Debye-Sears region, the phase of the light wave front emerging from the cell (at window 14) may be written:

$$\phi = \phi_1 S_1\left(t - \frac{x}{v}\right) \cos W_c\left(t - \frac{x}{v}\right)$$
$$+ \phi_2 S_2\left(t + \frac{x}{v}\right) \cos W_c\left(t + \frac{x}{v}\right) \quad (1)$$

where $W_c$ is $2\pi$ times the oscillator frequency, $x$ is the distance along the cell between each transducer 15 or 16 and the opposite end wall, and $v$ is the velocity of each compressional wave in the light modulator cell.

The optical field strength at the output plane (at window 14) of the cell may be written:

$$\mu_1 = \cos(W_o t + \phi). \quad (2)$$

This expression may be expanded and for small values of $\phi$ it becomes:

$$\mu = \cos W_o t \cos \phi + \phi \sin W_o t. \quad (3)$$

The term, $\cos W_o t \cos \phi$, represents a uniform plane wave containing the light transmitted through the modulator cell which is not deflected by the compressional waves. The other term, $\phi \sin W_o t$, designates the light transmitted through the cell which is deflected by the compressional waves.

The optical system 11 at the output side of the light modulator cell 10 includes a Fourier transform lens 20 which focuses this uniform plane wave ($\cos W_o t \cos \phi$) onto an opaque stop 21 and therefore cause it to disappear.

The remaining component of the light output from the cell (expressed by the term $\phi \sin W_o t$ in equation 3) passes through an imaging lens 22, which reimages it on an image plane 23. A time-integrating imaging detector 12, preferably the screen of a television pickup tube, such as a Vidicon tube, is located at the image plane 23.

The light intensity at the output plane (at exit window 14) of the cell 10 is:

$$I_o = \phi^2 = \phi_1^2 S_1^2\left(t - \frac{x}{v}\right) \cos^2 W_c\left(t - \frac{x}{v}\right) + \phi_2^2 S_2^2\left(t + \frac{x}{v}\right) \cos^2 W_c\left(t + \frac{x}{v}\right)$$
$$+ 2\phi_1\phi_2 S_1\left(t - \frac{x}{v}\right) S_2\left(t + \frac{x}{v}\right) \cos W_c\left(t - \frac{x}{v}\right) \cos W_c\left(t + \frac{x}{v}\right) \quad (4)$$

As long as $W_oT \gg 1$, integrating $I_o$ from $0$ to $T$ yields $$\int_0^T I_o dt = \frac{\phi_1^2}{2}\int_0^T S_1^2\left(t-\frac{x}{v}\right)dt + \frac{\phi_2^2}{2}\int_0^T S_2^2\left(t+\frac{x}{v}\right)dt$$
$$+ \phi_1\phi_2 \int_0^T S_1\left(t-\frac{x}{v}\right)S_2\left(t+\frac{x}{v}\right)dt \cos^2 \frac{W_o X}{V} \quad (5)$$

The third and final term in this expression is the desired cross-correlation function of signals $S_1$ and $S_2$ as the modulation on a spatial carrier, $$\cos 2W_o \frac{X}{V},$$

having a frequency of $2W_c$.

The Vidicon 12 performs the integration specified by equation (5). The output from the Vidicon 12 is applied to a bandpass filter 24, which rejects the first two terms and passes only the final term of equation (5). Consequently, the output of filter 24 contains the desired cross-correlation function of the unknown input signal $S_1$ and the known reference signal $S_2$. This cross-correlation function can be recovered from the output of filter 24 by conventional demodulation techniques, as indicated schematically by the demodulator 25 in FIG. 1.

Cross correlation of two signals requires:
1. delaying one signal relative to the other;
2. then multiplying the two signals together; and
3. time-integrating this product.

From the foregoing analysis it will be apparent that the present arrangement provides at the image plane 23 the product of the two signals, $S_1$ and $S_2$, which have been delayed in the modulator cell 10, and that this product is the modulation on the spatial carrier, $$\cos 2W_o \frac{X}{V},$$

which makes it separable by the filter 24 from the other light components also present at the image plane.

The presence of a time-integrating detector, such as a Vidicon tube, at the image plane enables an actual time integration of the product of the delayed signals $S_1$ and $S_2$. Each point on the face of this tube which receives light transmitted through the modulator cell 10 provides a cross-correlation of the two signals $S_1$ and $S_2$ with a particular time shift which is different from the time shift for the other light-receiving points in the image plane. Thus, the multiplicity of such points on the face of the Vidicon tube perform a multiplicity of cross-correlations of the two signals with different time shifts, and the electrical output signal from this tube is the totality of such cross correlations.

An important advantage of the present invention is that this time integration is not limited to the time period during which the compressional waves travel along the length of the modulator cell 10 from each transducer to the opposite end of the cell. Instead the integration time in the present invention depends upon the operating characteristics of the Vidicon tube 12, which can be adjusted to provide a relatively long integration time. This is because each light-receiving point on the imaging detector in the image plane 23 integrates over a period of time the light at a corresponding point along the exit window 14 of the modulator cell 10. This is in contrast to prior spatial integration arrangements in which the detector integrates the light at all points along the modulator cell at any given time, so that the maximum integration time of the detector is equal to the time it takes an acoustic compressional wave to travel from the transducer to the opposite end of the cell.

The present system, because of its longer possible integration time, is adapted for cross-correlating long duration signal sequences, such as noise, which were too long to be cross-correlated in their entirety by the prior systems.

Another advantage of the present system is that the "key" or reference signal $S_2$ may be time-offset from the unknown incoming signal $S_1$ by as much as the compressional wave propagation time of the modulator cell and still provide cross-correlation for the particular time shift along the cell in which the time-offset between signals $S_2$ and $S_1$ is zero. This is because the present system provides at different points across the image plane 23 a series of correlations for different time shifts of the two signals, and the offset between the two signals will be zero at one particular point in the image plane.

Another advantage of the present system is that the optical system components do not have to be diffraction limited. The inlet and exit windows 13 and 14 of the modulator cell 10 do not have to be optically flat. Also, the light source has only minimal spatial coherence requirements; it may be a gas discharge lamp instead of a laser, for example. Consequently, the present system may be constructed at relatively low cost and may be relatively compact physically.

Also, in the present system the product of the two acoustic compressional wave signals in the cell 10 is the same at all points along the cell, despite their attenuation by the liquid in the cell, because they originate at opposite ends of the cell. Consequently, the ease and accuracy of correlation are improved and a longer modulator cell may be used.

Figure 2:
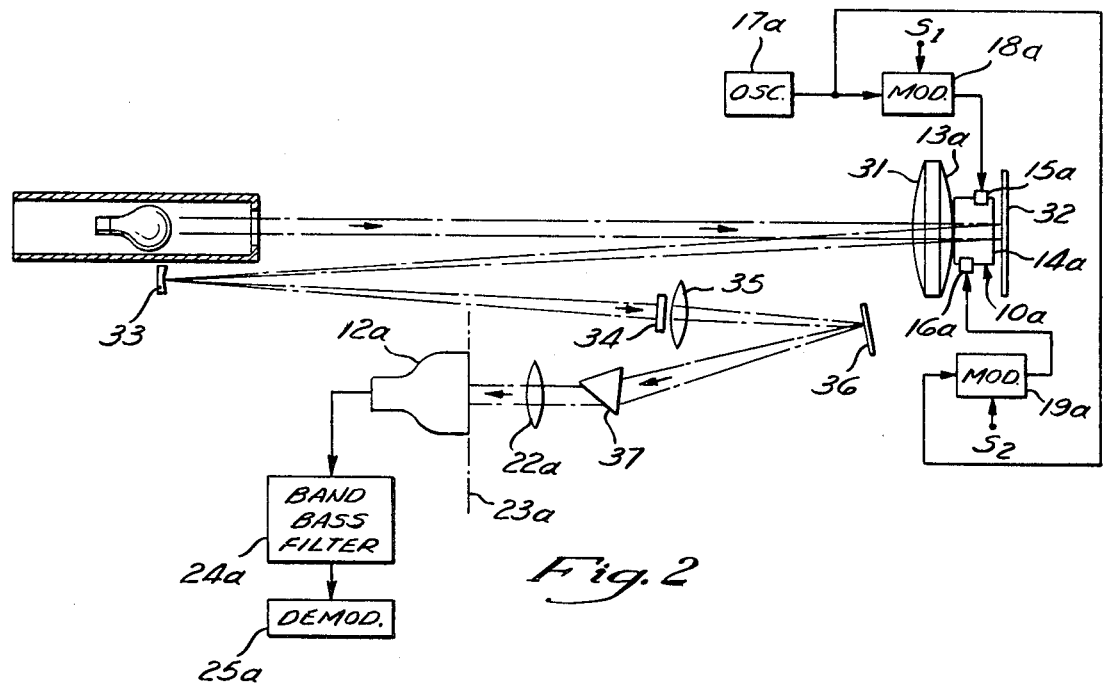
FIG. 2 is a schematic view of a second embodiment of a signal correlator in accordance with the present invention.

FIG. 2 shows a cross correlator in accordance with the present invention which is essentially similar to that of FIG. 1, but is improved by the addition of an optical grating to reduce the resolution requirements of the time-integrating imaging detector. Corresponding elements of the FIG. 2 system have the same reference numerals, with an "a" suffix added, as those of FIG. 1 and the detailed description of these elements will not be repeated.

The collimated light source in FIG. 2 comprises a lamp 30 and a collimating and Fourier transform lens 31 located between this lamp and the light modulator cell 10a. A plane mirror 32 is positioned a short distance from, and at a slight angle to, the exit window 14a on the opposite side of the modulator cell 10a from the light source. Consequently, the light transmitted through cell 10a is reflected back through the cell and undergoes a Fourier transform by the lens 31 before passing to a parabolic reflecting mirror 33 on which is positioned a stop corresponding to the stop 21 in FIG. 1. The light reflected from mirror 33 passes through a grating 34 and a field lens 35 to a plane reflecting mirror 36, and from there through a prism 37 and the final imaging lens 22a onto the face of a Vidicon tube 12a, whose output is connected to a band-pass filter 24a.

In accordance with this embodiment of the invention the optical grating 34, which is located in the light path between the light modulator cell 10a and the time-integrating imaging detector 12a, reduces the spatial carrier frequency appearing at the image or output plane 23a while still enabling the cross-correlation product term to be separated from the outer light appearing at this plane.

Equation (5) may be rewritten as follows:

$$I = I_{DC} + R_{12}\left(\frac{2X}{V}\right)\cos 2\frac{W_o X}{V} \quad (6)$$

where $I_{DC}$ represents the first two terms in Equation (5) and $R_{12}\left(\frac{2X}{V}\right)$ is the desired correlation function, which is expressed as $$\phi_1 \phi_2 \int_0^T S_1\left(t-\frac{X}{v}\right)S_2\left(\frac{X}{v}\right)dt$$

in Equation (5).

Equation (6) expresses the light intensity at the image plane 23a.

The desired correlation function, $$R_{12}\left(\frac{2X}{v}\right),$$

appears on the spatial carrier, $$\cos 2\left(\frac{w_c X}{v}\right),$$

at a spatial frequency of $$\frac{2f}{v}$$

cycles per meter. This means that the spatial carrier must be resolved by the Vidicon tube or other imaging detector, and the resolution requirements are substantially more severe than those necessary to resolve the correlation function alone.

In accordance with the aspect of the present invention now under discussion, the grating 34 in FIG. 2 is positioned so that its grating lines are at an angle $\phi$ with respect to the spatial carrier. This relationship is illustrated schematically in FIG. 4. With the grating so positioned, the light intensity at the image plane can be expressed:

$$I = \left[I_{DC} + R_{12}\left(\frac{2X}{V}\right)\cos 2\,\frac{WX}{V}\right]$$
$$\left[1 + \cos\frac{2W}{V}(x\cos\phi + y\sin\phi)\right] \quad (7)$$

Assuming that the Vidicon tube 12a or other imaging detector acts as a low-pass filter which eliminates all frequencies at $$2\frac{WX}{V}$$

and above, the effective intensity becomes:

$$I_e = I_{DC} + \dot{R}_{12}\cos\frac{2WX}{V}\cos\frac{2W}{V}(X\cos\phi + y\sin\phi) \quad (8)$$

$$I_e = I_{DC} + R_{12}\cos\frac{2W}{V}\left[X(1-\cos\phi) + y\sin\phi\right] \quad (9)$$

Expression (9) can be written as $$I_e = I_{DC} + R_{12}\cos 2\sqrt{2}\,\frac{w}{v}\sqrt{(1-\cos\phi)}\,y' \quad (10)$$

where $y'$ is the $y$ value measured in a coordinate system rotated by an angle $\phi/2$ with respect to the unprimed coordinates. Expression (10) indicates that $R_{12}$ can be recovered by rasterscanning the Vidicon tube 12a in a series of lines running parallel to the $y'$ axis, as shown in FIG. 4.

Figure 4:
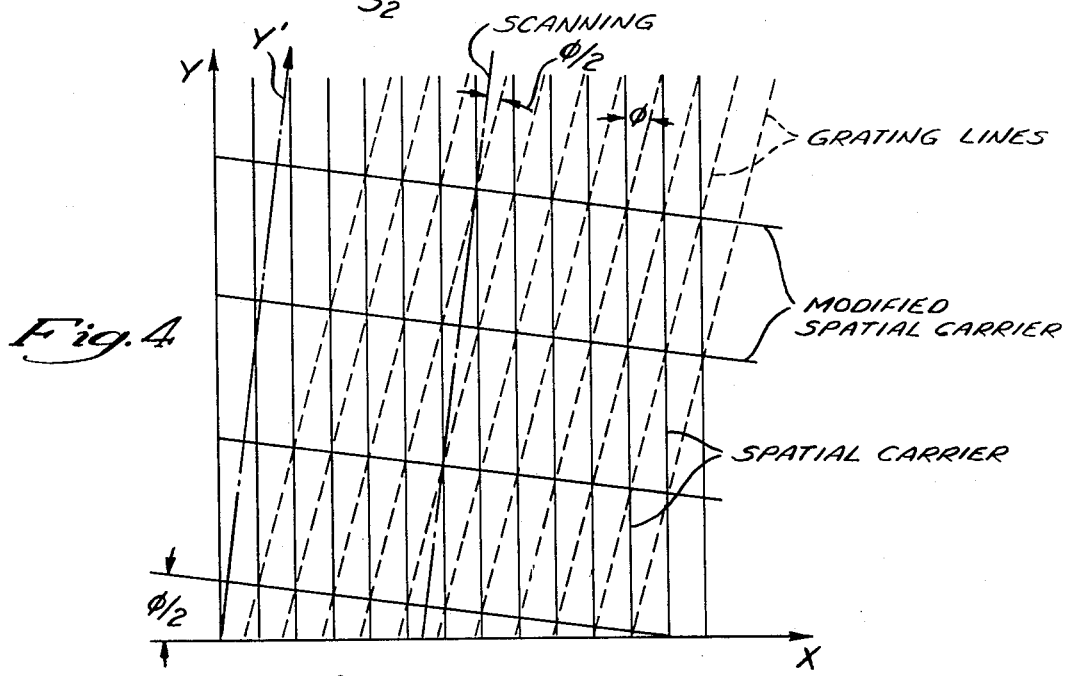
FIG. 4 illustrates the effect of an optical grating in FIG. 2.

The grating lines coact with the spatial carrier coming into the grating 34 to produce an interference effect, so that going out of the grating 34 the spatial carrier is rotated almost 90°, as indicated by the "modified spatial carrier" lines in FIG. 4. This modified spatial carrier is at a much lower frequency than the unmodified spatial carrier going into the grating 34, and it is at a steep angle (almost 90°) to the correlation function which modulates it. Consequently, the resolution requirements of the Vidicon tube 12a are greatly reduced.

As an example, assume that the Vidicon tube 12a has a resolution of 300 lines, and that 500 cycles of the spatial carrier appear across the Vidicon face. Without the optical grating 34 the carrier would not appear in the Vidicon output. If a 500-line grating is placed with its lines at an angle of 0.1 radian with respect to the spatial carrier, this enables the previously unresolvable carrier to display 500 $\phi$ or 50 cycles across the Vidicon face. By scanning at an angle of 0.05 radian to the vertical over one-tenth of the Vidicon face, five cycles of the spatial carrier could be included in the scan pattern.

Another aspect of the present invention is directed to a multichannel spectrum analyzer which is another practical application of the present system that requires only slight changes from the correlator already described. Such a spectrum analyzer is illustrated schematically in FIG. 3, and corresponding parts of the FIG. 3 system are given the same reference numerals as those in the FIG. 1 system, but with a "b" suffix added.

Figure 3:
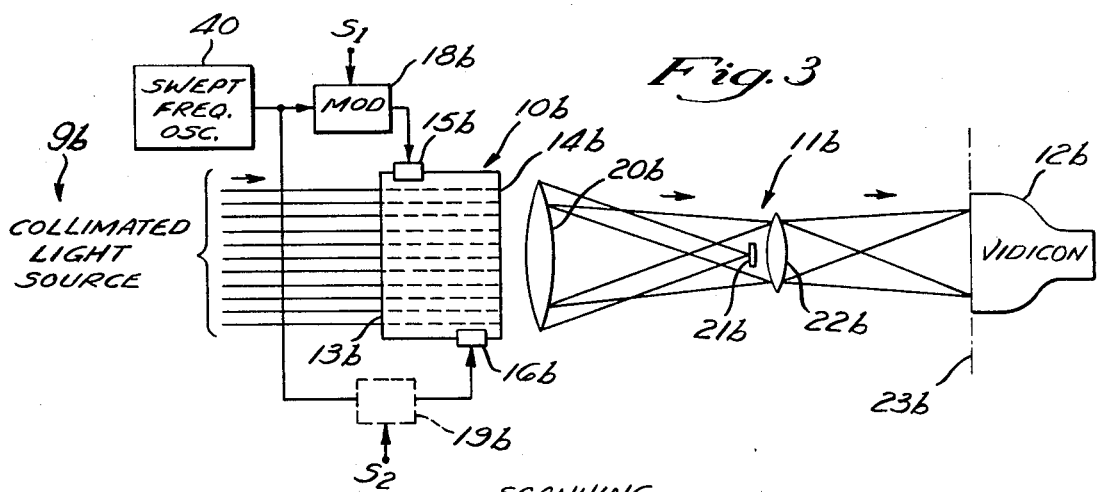
FIG. 3 is a schematic view of a spectrum analyzer in accordance with the present invention.

In FIG. 3, the piezoelectric transducers 15b and 16b in the light modulator cell 10b are energized by a swept frequency oscillator 40, whose frequency varies with time (preferably, linearly), over a given frequency bandwidth repetitively or cyclically. The oscillator output is amplitude modulated in the modulator 18b by the input signal $S_1$ before being applied to the first transducer 15b in the light modulator cell 10b.

The oscillator output also is applied to the second transducer 16b. In FIG. 3, the oscillator output is shown as applied to a modulator 19b (shown in phantom) to which is applied a signal $S_2$ which amplitude modulates the oscillator output. In actual practice, as explained hereinafter, the modulator 19b and the second input signal $S_2$ may be omitted, so that the unmodulated output of oscillator 40 is applied directly to the second transducer.

However, considering the general case now under discussion, the signals applied to the two transducers 15b and 16b, respectively, are:

$$S_1(t)\cos(w_c + \tfrac{1}{2}a\,t)\,t,$$

and $$S_2(t)\cos(w_c + \tfrac{1}{2}a\,t)t.$$

In the image plane 23b the electric field strength $\mu$ is:

$$\mu(x,t) = S_1(t-x/v)\cos\left[w_c + \frac{a}{2}(t-x/v)\right](t-x/v)$$
$$+ S_2(t+x/v)\cos\left[w_c + \frac{a}{2}(t+x/v)\right](t+x/v) \quad (11)$$

The light intensity on the vidicon is $|\mu(x,t)|^2$ and after integrating for a time $T$ the resulting response is:

$$r(x) = \tfrac{1}{2}\int_0^T (S_1^2 + S_2^2)\,dt$$
$$+ \int_0^T S_1(t-x/v)\,S_2(t+x/v)\cos\left(2w_c\frac{x}{v} + 2a\frac{xt}{v}\right)dt \quad (12)$$

In developing this, the cosine cross product was written as sum and difference terms and the sum terms were dropped since they integrate to 0.

If the cosine term is now rewritten as a product, $r$ becomes $$r(x) = r_{DC}$$
$$+ \cos\frac{2Wx}{v}\int_0^T S_1(t-x/v)\,S_2(t+x/v)\cos\left(2a\frac{x}{v}\right)t\,dt$$
$$- \sin\frac{2wx}{v}\int_0^T S_1(t-x/v)\,S_2(t+x/v)\sin\left(2a\frac{x}{v}\,t\right)dt \quad (13)$$

If both $S_1$ and $S_2$ are slowly varying, so that $$S_1(t-x/v) = S_1(t),$$

and $$S_2(t+x/v) = S_2(t),$$

then $$r(x) = r_{DC}$$
$$+ \cos\frac{2Wx}{v}\int_0^T S_1(t)\,S_2(t)\cos\left(2a\frac{x}{v}\right)t\,dt$$
$$- \sin\frac{2Wx}{v}\int_0^T S_1(t)\,S_2(t)\sin\left(2a\frac{x}{v}\right)t\,dt \quad (14)$$

The integral terms in $r$ are the Fourier sine and cosine transforms of the product $S_1\,S_2$. Therefore, the response above is the Fourier transform of the product $S_1\,S_2$. The amplitude of the transform is the amplitude of the spatial carrier and the phase is the phase of the carrier. The frequency in the transform varies with $x$, so that the transform of $S_1\,S_2$ is displayed in the $x$ direction.

Some interesting aspects of this transform relationship are:

1. The frequency components of the product are displayed in the horizontal direction across the face of the Vidicon.

2. The frequency scale in the transform is electronically programmable by changing $a$, the slope of the frequency versus time sweep of the oscillator 40.

3. In principle, arbitrarily narrow analyzer bandwidth is attainable since the integration time $T$ may be made very large.

4. The number of frequency resolution cells is equal to twice the time bandwidth product of the acoustic device and is independent of the bandwidth chosen for each cell.

In the foregoing general example, if the second signal $S_2$ is assumed to be a constant, then the frequency components of $S_1$ alone will be displayed in the horizontal direction across the Vidicon. This is the condition when the modulator 19b is omitted in FIG. 3.

To illustrate the principles just discussed, consider an acoustic cell having 80 $\mu$sec of delay and 3 mHz. of bandwidth centered at 7.5 mHz. Suppose it is desired to construct a multiple channel filter having a 10 c.p.s. frequency resolution.

Since a 10 c.p.s. resolution is desired, $T$ will be chosen as 0.1 sec. $S_2$ will be chosen to be constant in this case and a spectrum analysis of $S_1$ will result. With a 3 mHz. bandwidth and 0.1 sec. integration time, the maximum frequency slope which can be used is:

$$a = \frac{3 \text{ mhz.}}{.1 \text{ sec.}} = 30 \text{ mhz./sec.}$$

With this value the transformation becomes $$\int_0^{.1} S_1(t) \cos 120 \times 10^6 \left(\frac{x}{v}\right) t \, dt$$

The range on $\frac{x}{v}$ is 80 $\mu$sec., so the frequency range which can be analyzed is $$(\Delta f)_{\text{Tot}} = 120 \times 10^6 \times 80 \times 10^{-6} \approx 10^4 \text{ cycles}$$

Thus, there are on the order of $10^3$ 10 c.p.s. channels available in this arrangement.

By a simple change of slope on the swept oscillator 40, this system could be converted to $10^3$ 1 c.p.s. channels or any other value consistent with the condition $S_1(t-x/v) \approx S_1(t)$.

Figure 5:
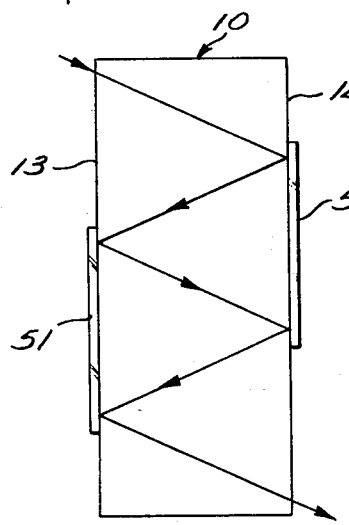
FIG. 5 is a schematic end view of a modified light modulator cell in the present system.

FIG. 5 illustrates a modified light modulator cell which may be used in the signal correlator of FIG. 1 or FIG. 2 or in the spectrum analyzer of FIG. 3.

In FIG. 5 the ultrasonic compressional waves are directed perpendicular to the plane of the paper. In accordance with this modification a mirror 50 extends across part of the window 14 at the output side of the cell, and a mirror 51 extends across part of the window 13 at the input side of the cell. The incoming light is at an acute angle with respect to perpendicularity to the windows 13 and 14 of the cell. The incoming light first passes through a transparent portion of window 13 and then it passes through the elastic medium within the cell over to the mirror 50, from which it is reflected back to mirror 51, and then back and forth between mirrors 51 and 50 until it passes out through a transparent portion of the exit window 14 of the cell. Within the cell the angle of incidence of the light impinging on each mirror 50 or 51 is equal to the angle of reflection. The number of passes the light makes within the cell back and forth between the mirrors depends upon the angle of incidence of the incoming light and the respective lengths and positions of the mirrors.

The purpose of this arrangement is to lengthen the light path within the cell between its entry and its exit. In the cell the optical phase modulation produced by the acoustic pressure is given by $$\phi_m = c \frac{PL}{h} \quad (15)$$

, where $\phi_m$ is the maximum phase deviation produced on the light wave, $P$ is the acoustic power, $L$ is the length of the optical path in acoustic medium within the cell, $h$ is the height of the acoustic beam, and $c$ is a constant relating to the properties of the acoustic medium.

Where the light beam makes a single pass through the cell, the ratio $L/h$ usually cannot be made very large because of diffraction effects in the acoustic beam. Consequently, the acoustic power requirements usually are relatively high.

However, in accordance with the present modification, by lengthening the optical path $L$ in the manner indicated the acoustic power requirements are reduced correspondingly.

From the foregoing description it will be evident that the present invention is susceptible of various embodiments which enable its use as a single correlator or as a spectrum analyzer, as desired, with improved results over prior arrangements for these purposes. However, while certain presently preferred embodiments of the invention have been disclosed in detail, it is to be understood that various modifications, omissions and refinements which depart from the disclosed embodiments may be adopted without departing from the scope of this invention.

I claim:

1. An acousto-optical signal processing system comprising:
   a light source;
   a light modulator positioned to receive light from said source and having a light-transmitting compressional wave medium therein, and a pair of electroacoustic transducers for generating oppositely directed compressional waves in said medium transverse to the direction of light transmission therethrough;
   oscillator means for energizing said transducers in phase and at the same frequency, signal input means for amplitude modulating the oscillations applied to at least one of said transducers;
   an optical system for imaging onto an image plane the light transmitted through the modulator which is deflected by said compressional waves;
   and light-responsive, time-integrating detector means at the image plane extending over at least a substantial portion of the image thereat of the light transmitted through the modulator and deflected by said compressional waves.

2. A system according to claim 1, wherein said detector means is an imaging detector which provides a point-for-point correspondence of the light image thereat with the light output intensity along said modulator transverse to the direction of the light transmission therethrough.

3. A system according to claim 1, wherein said oscillator means operates at a constant frequency, and said input signal means comprises a first signal source which amplitude modulates the oscillations applied to one of said transducers, and a reference signal source which amplitude modulates the oscillations applied to the other of said transducers.

4. A system according to claim 1, wherein the frequency of said oscillator means varies with time cyclically, and said input signal means comprises a signal source which amplitude modulates the oscillations applied to one of said transducers, and the oscillations applied to the other of said transducers are unmodulated.

5. A signal-processing system according to claim 2, wherein said detector means has a light integration time substantially longer than the time for propagation of a compressional wave through the modulator.

6. A signal-processing system according to claim 5, wherein said detector means is a television picture pickup tube.

7. A signal-processing system according to claim 2, wherein said optical system includes an optical grating having grating lines disposed at an acute angle to the spatial carrier light output from the modulator.

8. A signal-processing system according to claim 1, and further comprising light reflecting means at the modulator for causing the light to pass more than once through said medium transverse to said compressional waves before reaching said optical system.

9. An acousto-optical signal-processing system comprising:
   a light modulator cell having an entry window and an exit window and filled with a light-transmitting elastic medium for transmitting light between said windows, a first electromechanical transducer at one end of the cell for generating a first compressional wave in said medium transverse to the light transmitted therethrough, and a second electromechanical transducer at the opposite end of said cell for generating a second compressional wave in said medium in a direction substantially opposite to that of the first compressional wave;

oscillator means for energizing said transducers in phase and at the same instantaneous frequency, signal input means for amplitude modulating the oscillations applied to at least one of said transducers;

a light source for passing light through said cell from said entry window to said exit window to be phase modulated by said compressional waves so that the light output from the cell contains a uniform plane wave component and additional components which are deflected by the compressional waves;

an optical system at the output side of the cell including a stop, lens means for focusing said uniform plane wave component on said stop and for imaging said additional deflected components on an image plane to provide a point-for-point correspondence of the light intensity of said additional components in said image plane with their intensity along the cell at said exit window;

time-integrating light-responsive detector means at said image plane having an integration time substantially longer than the time for propagation of a compressional wave through the medium in the light modulator cell from one end of the cell to the other;

and electrical filter means connected to the output of said detector means for rejecting components of the light at said image plane other than the spatial carrier modulated by a cross-correlation function of the signals applied to said transducers in the cell.

10. A signal-processing system according to claim 9, wherein said oscillator means provides fixed-frequency oscillations for both transducers in the cell, and the oscillations applied to both transducers are amplitude modulated respectively by different input signals which are to be cross-correlated.

11. A signal-processing system according to claim 9, wherein said oscillator means provides oscillations whose frequency varies with time over a selected spectrum, the oscillations applied to the second transducer have a substantially constant amplitude, and the oscillations applied to the first transducer are amplitude modulated by a signal which is to be analyzed in said spectrum.

12. A signal-processing system according to claim 9, wherein said optical system includes an optical grating having a series of grating lines extending at an acute angle to the spatial carrier to produce an interference effect for providing a lower frequency modified spatial carrier at a substantial angle with respect to the cross-correlation function modulating signal.

13. A signal-processing system according to claim 9, wherein said detector means is a television picture pickup tube.

14. A signal-processing system according to claim 13, wherein said optical system includes an optical grating having a series of grating lines extending at an acute angle to the spatial carrier to produce an interference effect for providing a lower frequency modified spatial carrier at a substantial angle with respect to the cross-correlation function modulating signal.

15. A signal-processing system according to claim 9, and further comprising light reflector means at the cell for causing the light to pass across the cell more than once through said medium between said entry and exit windows.

16. A signal-processing system according to claim 15, wherein said light reflector means comprises reflectors at the opposite sides of the cell in the path of the light passing through said medium from said entry window to said exit window.

* * * * *